Patented July 8, 1947

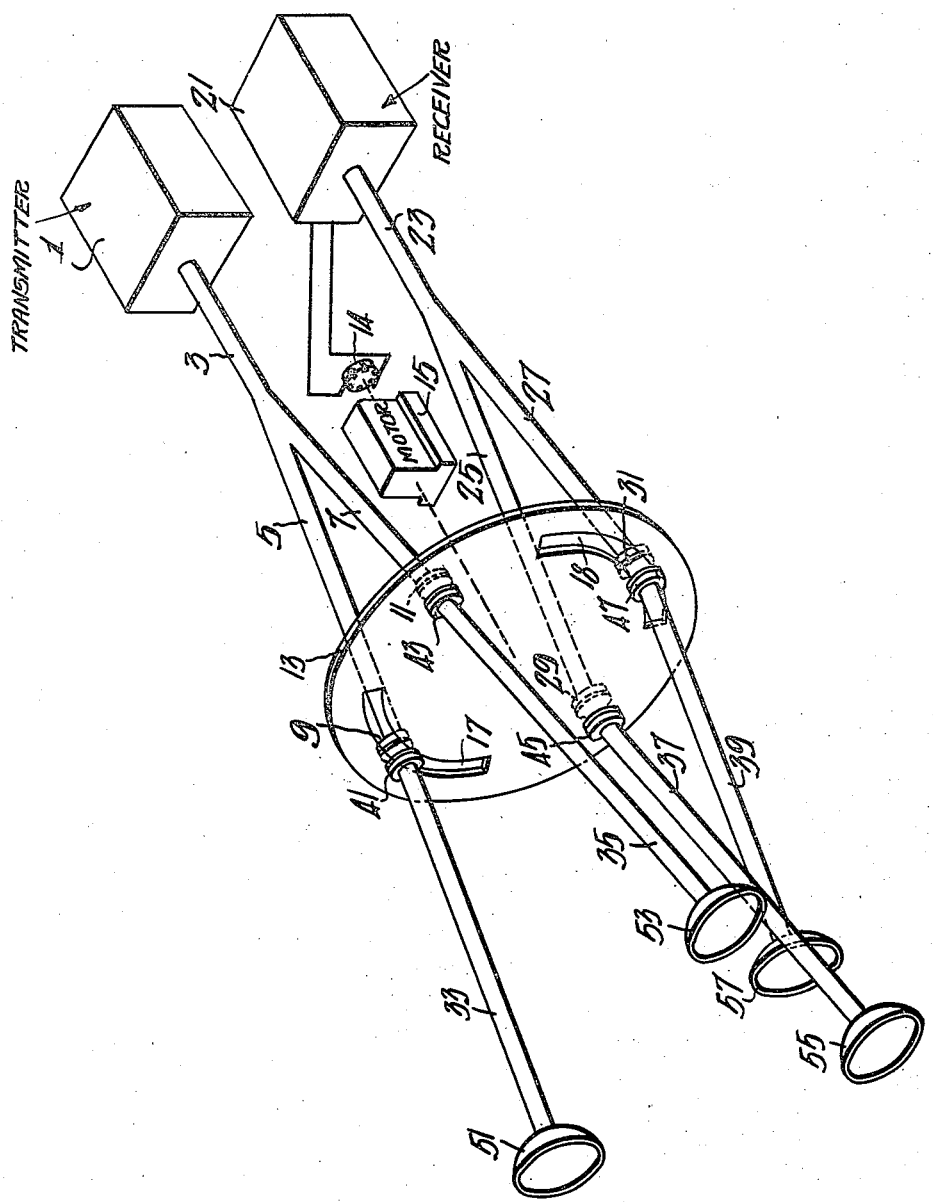

2,423,508

UNITED STATES PATENT OFFICE 2,423,508

WAVE GUIDE SWITCHING DEVICE

George W. Leck, Princeton Junction, N. J., assignor to Radio Corporation of America, a corporation of Delaware Application May 25, 1943, Serial No. 488,471

7 Claims. (Cl. 250—1.72)

This invention relates generally to super-high frequency transmission circuits and more particularly to a switching device for a wave guide transmission system.

Super-high frequency pulse echo beacon systems often require that super-high frequency pulses be transmitted alternately in different predetermined directions, and that adjacently located super-high directional receivers be conditioned to respond to transmitted pulses reflected from a distant object.

The instant invention contemplates a super-high frequency transmission system of the type described wherein the output circuits of a super-high frequency transmitter are coupled to an output wave guide. The output wave guide includes two tuned or odd multiple quarter wave branches which terminate in annular conductive flanges adjacent a rotating conductive disc. The disc is provided with apertures which are suitably located with respect to the flanges. The branched portions of the transmitter wave guide terminate at predetermined angular intervals along the path of the rotating disc apertures.

A super-high frequency receiver responsive to the transmitted energy also is coupled to an input wave guide which is branched to include two tuned or odd multiple quarter wave sections which are similarly terminated adjacent the rotatable apertured conductive disc.

The conductive disc may be apertured in any desired manner or, as in the system described in detail herein, may include two arcuate slots each having a width of the order of the width of the wave guides terminating adjacent thereto. The arcuate slots are displaced 180° on the conductive disc and are disposed at an equal radius from the center thereof. The conductive disc may be rotated in any convenient manner, such as, for example, by a constant speed motor.

Directionally disposed transmitting and receiving wave guides, each including directional reflectors at the remote ends thereof, are terminated in annular conductive flanges adjacent the opposite side of the rotating apertured disc, each coincident with a corresponding one of the transmitter or receiver wave guide branches. For example, one transmitter wave guide system and one receiver wave guide system, each directed in the same predetermined direction, are separated by 180° on the rotating disc. The remaining transmitter and receiver wave guides are each directed similarly in a second direction, and are relatively displaced 180° on the rotating disc, as well as 90°, or any suitable angle, from each of the differently directed guides. It will be seen that one transmitter wave guide and one receiver wave guide, having similar directional characteristics, will be energized during a portion of the rotation of the conductive apertured disc, while the remaining transmitter and receiver guides are effectively short-circuited by the blank portion of the conductive disc interposed between the annular conductive flanges of the guides. Since the branched portions of both the transmitter and receiver guides are tuned or proportioned to be of the order of odd multiples of a quarter wavelength, the effectively short-circuited portions thereof reflect extremely high impedances to the wave guide junction, thereby minimizing switching losses.

Among the objects of the invention are to provide an improved method of and means for interrupted propagation of waves through a wave guide transmission system. Another object of the invention is to provide an improved method of and means for switching wave guides in a multi-directional super-high frequency wave guide transmitting and receiving system. A further object of the invention is to provide an improved means for switching a plurality of wave guides in a super-high frequency signalling system, wherein arcuate oppositely disposed apertures in a rotating conductive disc are caused to travel intermediate the adjacently disposed ends of a plurality of pairs of wave guides, and wherein the adjacent ends of said guides are terminated in annular conductive flanges disposed substantially parallel to the rotating conductive disc. An additional object of the invention is to provide a system of the type described which includes a substantially constant speed motor drive for the apertured conductive disc and wherein said motor drive synchronously operates a commutating device connected to the transmitting or receiving circuits.

The invention will be described in further detail by reference to the accompanying drawing of which the single figure thereof is a schematic diagram of one embodiment thereof.

Referring to the drawing, the output circuits of a super-high frequency transmitter 1 are coupled to an output wave guide 3 which includes two odd multiple quarter wave branches 5, 7. The branched guides 5, 7 each terminate in annular conductive flanges 9, 11 which are disposed substantially parallel to and adjacent to a rotatable apertured conductive disc 13 which is driven at substantially constant speed by means of a motor 15. Apertures 17, 18 in the conductive disc 13 are arcuate in shape, disposed at equal radii from the center of the disc, and displaced 180° thereon. The branched wave guides 5, 7 terminate at points displaced 90° on the face of the disc 13 at a radius corresponding to that of the disc apertures.

A super-high frequency receiver 21, responsive to reflected signals from the transmitter 1, includes input circuits coupled to an input wave guide 23 which includes two odd multiple quarter wave branches 25, 27 similarly terminated in annular conductive flanges 29, 31 adjacent the rotatable conductive disc 13. The annular conductive flanges 29, 31 are displaced 90° from the annular conductive elements 9, 11, respectively, and are also displaced 90° from each other on the path of the rotating apertures 17, 18. A commutating device 14, may, if desired, be operable from the motor 15, and may be connected to either the transmitter 1, or to the receiver 21, as shown, for keying any desired circuit such as, for example, an indicator, not shown.

Directional transmitting and receiving wave guide sections 33, 35 and 37, 39 are terminated, adjacent the path of the apertures in the rotating disc 13, in annular conductive flanges 41, 43, and 45, 47, respectively. The first transmitting wave guide 33 includes a reflector 51, the second transmitter wave guide 35 includes a reflector 53. The two transmitter reflectors 51, 53 are aimed in different predetermined directions. Similarly, the first receiver wave guide 37 includes a reflector 55 and the second receiver wave guide 39 includes a reflector 57. The first receiver reflector 57 is aimed in the same direction as the first transmitter reflector 51, and the second receiver reflector 55 is aimed in the same direction as the second transmitter reflector 53.

The annular conductive flanges 41, 9 of the wave guides 33, 5 respectively, substantially coincide on opposite sides of the rotatable disc 13. The annular conductive flanges 43, 11 of the wave guides 35, 7 respectively, also substantially coincide on opposite sides of the rotatable disc 13. Similarly, the annular conductive flanges 47, 31 of the wave guides 39, 27 respectively, and the annular conductive flanges 45, 29 of the wave guides 37, 25 respectively, also substantially coincide on opposite sides of the rotating disc 13.

It will be seen that, at a given instant, the aperture 17 in the disc 13 coincides with the adjacent flanges 41, 9 of the wave guides 33, 5; the aperture 18 coincides with the conductive flanges 47, 31 of the wave guides 39, 27; while the solid portions of the rotatable disc 13 effectively shield the wave guides 7 and 25 from the wave guides 35, and 37 respectively. The odd multiple quarter wavelength guide branches 25, 27 of the receiver wave guide 23 each present substantially infinite impedances to waves in the guide 23 when the particular branch is effectively short-circuited by a solid portion of the rotatable disc 13, thereby minimizing guide losses for waves transmitted through the particular wave guide branch adjacent one of the rotating disc slots. For the purpose of minimizing spurious radiation or coupling in the vicinity of the conductive flanges adjacent the rotating disc, the faces of the flanges may be coated with an energy absorptive material such as, for example, conductive rubber.

Thus the invention described comprises an improved method of and means for efficiently switching a plurality of super-high frequency wave guides in predetermined sequence for operation of a super-high frequency directional signalling system.

I claim as my invention:

1. A wave guide switching device for a directional super-high frequency signalling system including a first wave guide, means for connecting said first wave guide to a super-high frequency transmitter, a second wave guide, means for connecting said second wave guide to a super-high frequency receiver, a rotatable conductive element apertured to include at least two oppositely disposed arcuate slots having a width of the order of the width of said wave guides, a first pair of wave guides branching from said first wave guide and terminated adjacent the path of said slotted portion of said element at predetermined angular intervals on said path, a second pair of wave guides branching from said second wave guide and terminated adjacent said path at predetermined angular intervals from each of said guides of said first pair, a third pair of wave guides having one end thereof terminated adjacent the opposite face of said element in operable relation to the respectively terminated ends of said first pair of guides, a fourth pair of wave guides having one end thereof terminated adjacent said opposite face of said element in operable relation to the respectively terminated ends of said second pair of guides, and means for rotating said element for alternately switching oppositely disposed guides of said third and said fourth pairs into operable relation with said adjacently terminated guides of said first and said second pairs of guides respectively.

2. A wave guide switching device for a directional super-high frequency signalling system including a first wave guide, means for connecting said first wave guide to a super-high frequency transmitter, a second wave guide, means for connecting said second wave guide to a super-high frequency receiver, a rotatable conductive element apertured to include at least two oppositely disposed arcuate slots having a width of the order of the width of said wave guides, a first pair of wave guides branching from said first wave guide and terminated adjacent the path of said slotted portion of said element at predetermined angular intervals on said path, a second pair of wave guides branching from said second wave guide and terminated adjacent said path at predetermined angular intervals from each of said guides of said first pair, a third pair of wave guides having one end thereof terminated adjacent the opposite face of said element in operable relation to the respectively terminated ends of said first pair of guides, a fourth pair of wave guides having one end thereof terminated adjacent said opposite face of said element in operable relation to the respectively terminated ends of said second pair of guides, annular conductive flanges surrounding the ends of each of said wave guides adjacent said rotatable element, and means for rotating said element for alternately switching oppositely disposed guides of said third and said fourth pairs into operable relation with said adjacently terminated guides of said first and said second pairs of guides respectively.

3. A wave guide switching device for a directional super-high frequency signalling system including a first wave guide, means for connecting said first wave guide to a super-high frequency transmitter, a second wave guide, means for connecting said second wave guide to a super-high frequency receiver, a rotatable conductive element apertured to include at least two oppositely disposed arcuate slots having a width of the order of the width of said wave guides, a first pair of wave guides branching from said first wave guide and terminated adjacent the path of said slotted portion of said element at intervals of 90° on said path, a second pair of wave guides branching from said second wave guide and terminated adjacent said path at intervals of 90° from each of said guides of said first pair, a third pair of wave guides having one end thereof terminated adjacent the opposite face of said element in operable relation to the respectively terminated ends of said first pair of guides, a fourth pair of wave guides having one end thereof terminated adjacent said opposite face of said element in operable relation to the respectively terminated ends of said second pair of guides, annular conductive parallel disposed flanges surrounding the ends of each of said wave guides adjacent said rotatable element, and means for rotating said element for alternately switching oppositely disposed guides of said third and said fourth pairs into operable relation with said adjacently terminated guides of said first and said second pairs of guides respectively.

4. A wave guide switching device for a directional super-high frequency signalling system including a first wave guide, means for connecting said first wave guide to a super-high frequency transmitter, a second wave guide, means for connecting said second wave guide to a super-high frequency receiver, a rotatable conductive element apertured to include at least two oppositely disposed arcuate slots having a width of the order of the width of said wave guides, a first pair of wave guides branching from said first wave guide and terminated adjacent the path of said slotted portion of said element at intervals of 90° on said path, a second pair of wave guides branching from said second wave guide and terminated adjacent said path at intervals of 90° from each of said guides of said first pair, a third pair of wave guides having one end thereof terminated adjacent the opposite face of said element in operable relation to the respectively terminated ends of said first pair of guides, a fourth pair of wave guides having one end thereof terminated adjacent said opposite face of said element in operable relation to the respectively terminated ends of said second pair of guides, super-high frequency wave reflectors terminating the ends remote from said rotatable element of each of said guides of said third and said fourth pairs of guides, said reflectors on said oppositely disposed guides being similarly oriented and said reflectors on said adjacently disposed guides being differently oriented, and means for rotating said element for alternately switching oppositely disposed guides of said third and said fourth pairs into operable relation with said adjacently terminated guides of said first and said second pairs of guides respectively.

5. A wave guide switching device for a directional super-high frequency signalling system including a first wave guide, a super-high frequency transmitter, means connecting said first wave guide to said super-high frequency transmitter, a second wave guide, a super-high frequency receiver, means connecting said second wave guide to said super-high frequency receiver, a rotatable conductive element apertured to include at least two oppositely disposed arcuate slots having a width of the order of the width of said wave guides, a first pair of wave guides branching from said first wave guide and terminated adjacent the path of said slotted portion of said element at predetermined angular intervals on said path, a second pair of wave guides branching from said second wave guide and terminated adjacent said path at predetermined angular intervals from each of said guides of said first pair, a third pair of wave guides having one end thereof terminated adjacent the opposite face of said element in operable relation to the respectively terminated ends of said first pair of guides, a fourth pair of wave guides having one end thereof terminated adjacent said opposite face of said element in operable relation to the respectively terminated ends of said second pair of guides, and means for rotating said element for alternately switching oppositely disposed guides of said third and said fourth pairs into operable relation with said adjacently terminated guides of said first and said second pairs of guides respectively.

6. A wave guide switching device for a directional super-high frequency signalling system including a first wave guide, a super-high frequency transmitter, means connecting said first wave guide to said super-high frequency transmitter, a second wave guide, a super-high frequency receiver, means connecting said second wave guide to said super-high frequency receiver, a rotatable conductive element apertured to include at least two oppositely disposed arcuate slots having a width of the order of the width of said wave guides, a first pair of wave guides branching from said first wave guide and terminated adjacent the path of said slotted portion of said element at intervals of 90° on said path, a second pair of wave guides branching from said second wave guide and terminated adjacent said path at intervals of 90° from each of said guides of said first pair, a third pair of wave guides having one end thereof terminated adjacent the opposite face of said element in operable relation to the respectively terminated ends of said first pair of guides, a fourth pair of wave guides having one end thereof terminated adjacent said opposite face of said element in operable relation to the respectively terminated ends of said second pair of guides, super-high frequency wave reflectors terminating the ends remote from said rotatable element of each of said guides of said third and said fourth pairs of guides, said reflectors on said oppositely disposed guides being similarly oriented and said reflectors on said adjacently disposed guides being differently oriented, and motor driven means for rotating said element for alternately switching oppositely disposed guides of said third and said fourth pairs into operable relation with said adjacently terminated guides of said first and said second pairs of guides respectively.

7. A wave guide switching device for a directional super-high frequency signalling system including a first wave guide, means for connecting said first wave guide to a super-high frequency transmitter, a second wave guide, means for connecting said second wave guide to a super-high frequency receiver, a rotatable conductive element apertured to include at least two oppositely disposed arcuate slots having a width of the order of the width of said wave guides, a first pair of wave guides branching from said first wave guide and terminated adjacent the path of said slotted portion of said element at intervals of 90° on said path, a second pair of wave guides branching from said second wave guide and terminated adjacent said path at intervals of 90° from each of said guides of said first pair, a third pair of wave guides having one end thereof terminated adjacent the opposite face of said element in operable relation to the respectively terminated ends of said first pair of guides, a fourth pair of wave guides having one end thereof terminated adjacent said opposite face of said element in operable relation to the respectively terminated ends of said second pair of guides, and motor driven means for rotating said element for alternately switching oppositely disposed guides of said third and said fourth pairs into operable relation with said adjacently terminated guides of said first and said second pairs of guides respectively.

GEORGE W. LECK.

REFERENCES CITED

The following references are of record in the file of this patent:

UNITED STATES PATENTS

| Number | Name | Date |
|---|---|---|
| 2,206,683 | Wolff | July 2, 1940 |
| 2,129,712 | Southworth | Sept. 13, 1938 |
| 2,206,923 | Southworth | July 9, 1940 |
| 2,396,044 | Fox | Mar. 5, 1946 |
| 1,337,737 | Van Ver Bijl | Apr. 20, 1920 |